United States Patent
Greene (10) Patent No.: US 11,855,993 B2
(45) Date of Patent: Dec. 26, 2023

(54) DATA SHIELD SYSTEM WITH MULTI-FACTOR AUTHENTICATION

(71) Applicant: DELINEA INC., Redwood City, CA (US)

(72) Inventor: James Greene, Millbrae, CA (US)

(73) Assignee: DELINEA INC., San Francisco, CA (US)

(*) Notice: Subject to any disclaimer, the term of this patent is extended or adjusted under 35 U.S.C. 154(b) by 15 days.

(21) Appl. No.: 17/166,664

(22) Filed: Feb. 3, 2021

(65) Prior Publication Data

US 2021/0258318 A1 Aug. 19, 2021

Related U.S. Application Data

(60) Provisional application No. 62/978,685, filed on Feb. 19, 2020.

(51) Int. Cl.
*H04L 9/40* (2022.01)
*G06F 21/62* (2013.01)

(52) U.S. Cl.
CPC ............ *H04L 63/102* (2013.01); *G06F 21/62* (2013.01); *H04L 63/0281* (2013.01); *H04L 63/08* (2013.01); *H04L 63/101* (2013.01); *H04L 2463/082* (2013.01)

(58) Field of Classification Search
CPC ... H04L 63/102; H04L 63/0281; H04L 63/08; H04L 63/101; H04L 2463/082; G06F 21/62
See application file for complete search history.

(56) References Cited

U.S. PATENT DOCUMENTS

| | | | |
|---|---|---|---|
| 9,313,208 B1* | 4/2016 | Letz | H04L 41/5074 |
| 10,623,446 B1* | 4/2020 | Stoler | H04L 63/101 |
| 2006/0029064 A1* | 2/2006 | Rao | H04L 61/2557 |
| | | | 370/389 |
| 2018/0026940 A1* | 1/2018 | Sastri | H04L 63/08 |
| | | | 711/202 |
| 2018/0234422 A1* | 8/2018 | Odom | H04L 63/10 |
| 2019/0207784 A1* | 7/2019 | Aizikovich | G06F 9/45558 |
| 2021/0126979 A1* | 4/2021 | Ngo | H04L 63/029 |
| 2021/0258318 A1* | 8/2021 | Greene | H04L 63/0281 |

* cited by examiner

*Primary Examiner* — Harris C Wang
(74) *Attorney, Agent, or Firm* — WOMBLE BOND DICKINSON (US) LLP (57) ABSTRACT

Techniques to facilitate protection of data resources from unauthorized access are disclosed herein. In at least one implementation, a data shield server instructs a user to replace an address and a port associated with a data resource with an updated address associated with the data shield server and a unique port that is uniquely assigned to the user. A request from the user to access the data resource is received at the updated address associated with the data shield server and on the unique port that is uniquely assigned to the user. In response to the request, the user is authenticated using multi-factor authentication to verify that an identity of the user that submitted the request matches the user assigned to the unique port on which the request was received. Upon successful authentication, the data shield server operates as a proxy to connect the user through to the data resource.

20 Claims, 6 Drawing Sheets

DATA SHIELD SYSTEM WITH MULTI-FACTOR AUTHENTICATION

RELATED APPLICATIONS

This application claims the benefit of, and priority to, U.S. Provisional Patent Application No. 62/978,685, entitled "DATA SHIELD SYSTEM WITH MULTI-FACTOR AUTHENTICATION", filed Feb. 19, 2020, which is hereby incorporated by reference in its entirety for all purposes.

TECHNICAL BACKGROUND

Anyone with a suitable Internet appliance, such as a personal computer with a standard Internet connection, may access and navigate web sites hosted on Internet-connected servers for the purpose of obtaining information and initiating transactions with hosts of such servers and web pages. Companies offer various subscription services accessible via the Internet. For example, it is common for people to bank, trade stocks, shop, and the like from the comfort of their own homes via Internet access. Typically, a user has access through subscription to personalized and secure web pages for such functions. By typing in a username and password or other personal identification code, a user may obtain information, initiate transactions, buy stock, and accomplish a myriad of other tasks.

Unfortunately, one problem that is encountered by an individual who has several or many such subscriptions to Internet-brokered services is that there are invariably many passwords or login codes to be used and it is not advisable to utilize the same password or code for every service as this poses an increased security risk. Furthermore, using different login identifiers and passwords for each online account presents numerous problems, not the least of which is remembering each login identifier and password. This secure access problem also manifests itself in an enterprise context. For example, employees must regularly access system servers. However, despite the security risks, passwords and other credential information are not regularly modified because such frequent changes are often overly burdensome.

Overall, the examples herein of some prior or related systems and their associated limitations are intended to be illustrative and not exclusive. Upon reading the following, other limitations of existing or prior systems will become apparent to those of skill in the art.

Overview

Techniques to facilitate protection of data resources from unauthorized access are disclosed herein. In at least one implementation, a data shield server instructs an authorized user to replace an address and a port associated with a data resource with an updated address associated with the data shield server and a unique port on the data shield server that is uniquely assigned to the authorized user. A request from a user to access the data resource is received at the updated address associated with the data shield server and on the unique port that is uniquely assigned to the authorized user. In response to the request, the user is authenticated using multi-factor authentication to verify that an identity of the user that submitted the request matches the authorized user assigned to the unique port on which the request was received. Upon successful authentication, the data shield server operates as a proxy to connect the user through to the data resource.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Users typically access remote databases, servers, data stores, cloud services, and other data resources available over the Internet by connecting directly to a domain or internet protocol (IP) address and port associated with a data resource. For example, to access a database, a user may configure a client application on a laptop or some other computing system with a specific IP address or fully qualified domain name (FQDN) associated with the database, along with a port number on which the database is listening for incoming connection requests. In general, there are common port numbers assigned to different types of data services. For example, all hypertext transfer protocol (HTTP) traffic is communicated on port 80, whereas MySQL™ databases utilize a standard port 3306, and the default port for PostgreSQL® is 5432. Unfortunately, because the host addresses of various data services generally do not change and the default ports to access them are commonly known, there are heightened security risks associated with hosting such services out in the open on the Internet, fully exposed to any malicious users who may attempt unauthorized access to these data resources.

The techniques disclosed herein provide for host systems to be placed behind a data shield server, which functions to conceal the host address and port information from both its legitimate users and the general public. Instead, users connect to the host system indirectly through the data shield server acting as a proxy, which also requires multi-factor authentication (MFA) to securely authenticate users before allowing them to access the host system through the data shield server. Specifically, when a user wants to connect to a host system that is protected by the data shield server, instead of connecting to the actual address and port number of the host system, the user is provided with an address of the data shield server and a unique port that is assigned to that specific user. The unique port is uniquely tied to the user's identity and for that particular host system only. Once the user updates the connection settings for accessing the host system by replacing the actual IP address or FQDN and port of the host system with the address of the data shield server and the unique port assigned to that user for that specific host, the user will connect to the data shield server on the unique port assigned to the user. The data shield server then requires the user to authenticate to the service using MFA, such as facial recognition, fingerprint identification, or one-time password delivered over email, phone, or some other token for identity verification. Once the user is authenticated by passing the MFA to verify that the identity of the user attempting to access the host matches the identity of the user assigned to the unique port on which the connection has been made, the data shield server grants the user access and acts as a proxy to connect the user through to the host system. In this manner, the address and port information of the host system remains hidden to the user and the rest of the Internet, thereby preventing any direct access to the host system and forcing all connections to the host to be made indirectly through the data shield server.

Figure 1:
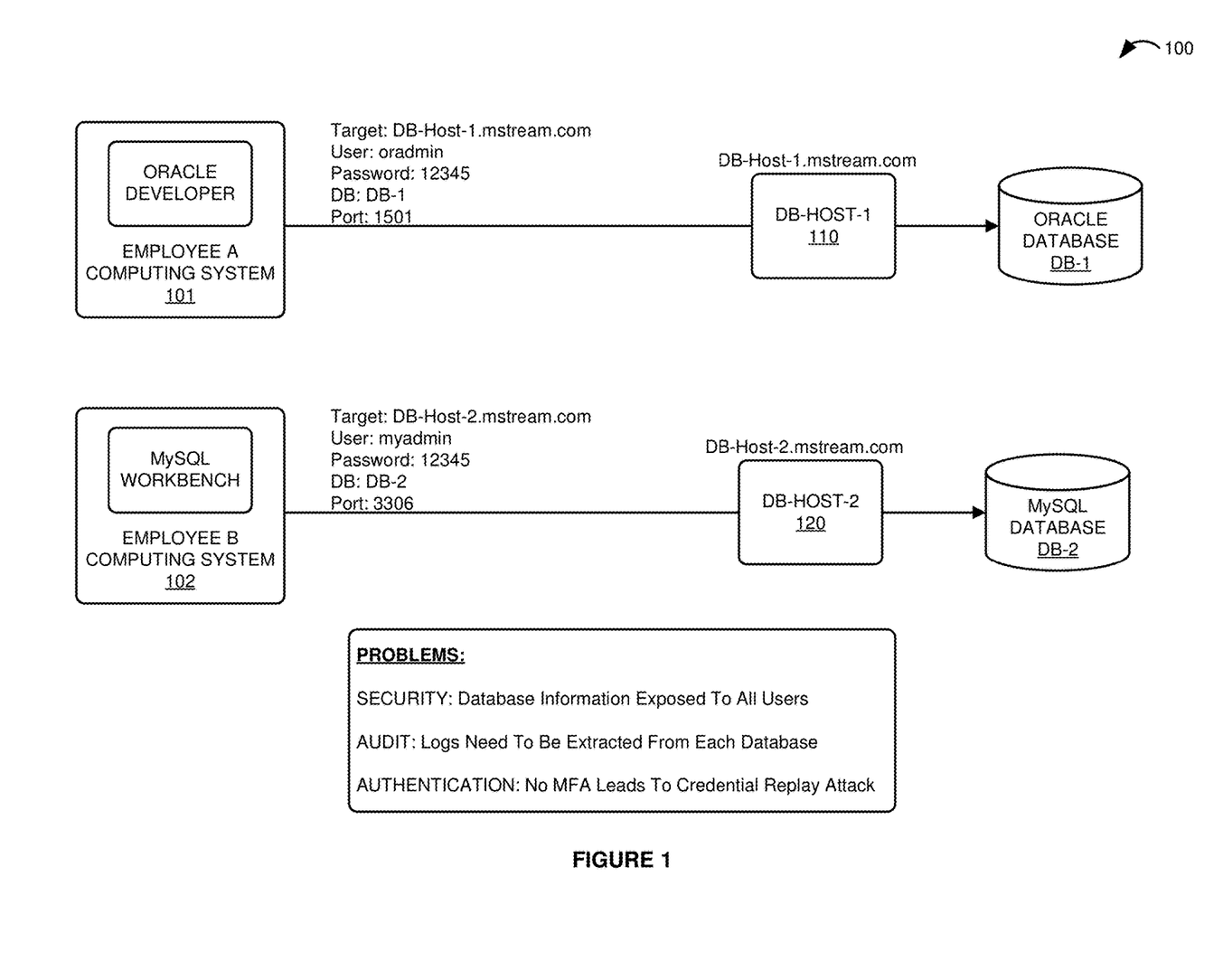
FIG. 1 is a block diagram that illustrates a communication system.
Figure 2:
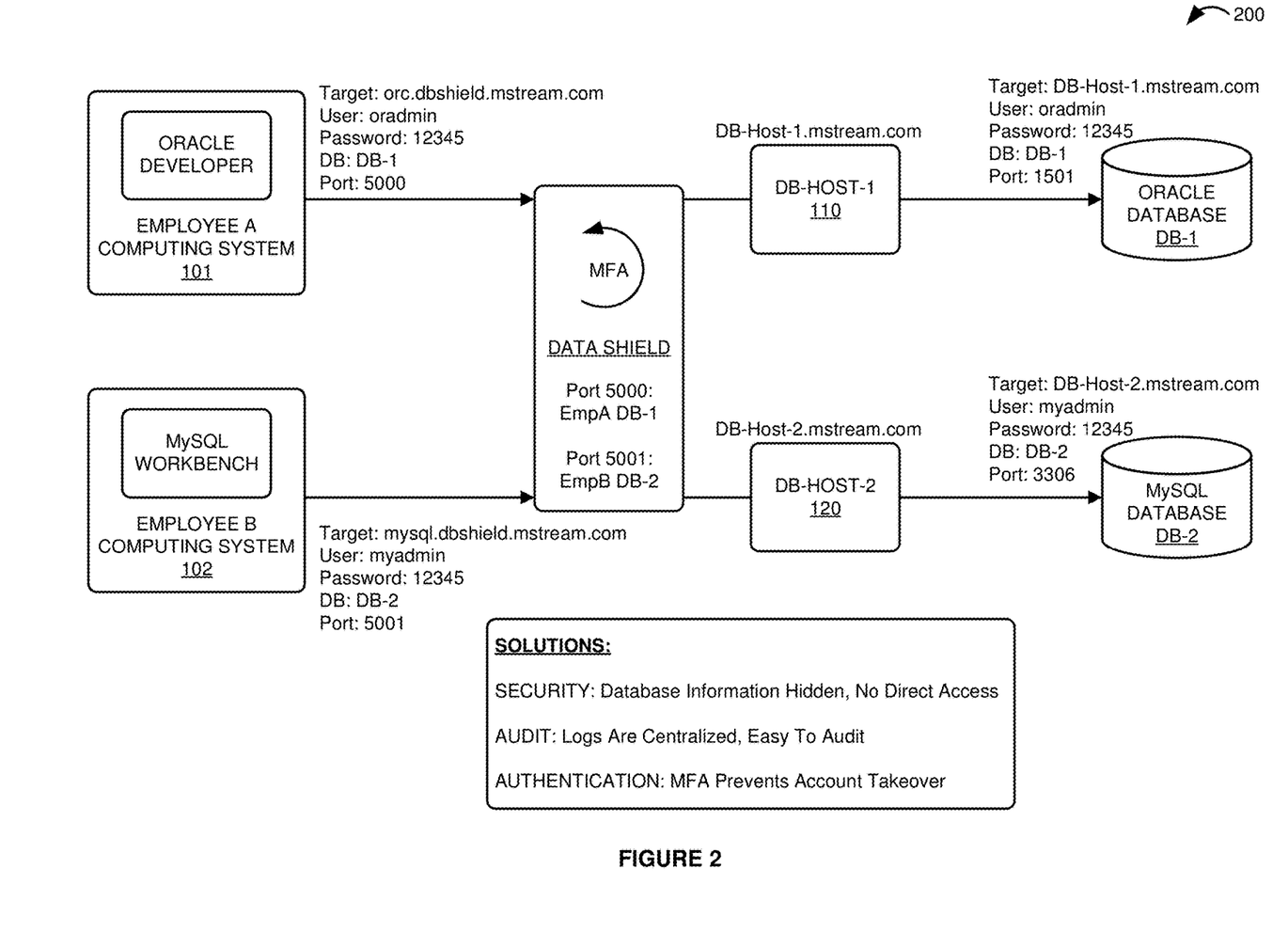
FIG. 2 is a block diagram that illustrates a communication system in an exemplary embodiment.
Figure 3:
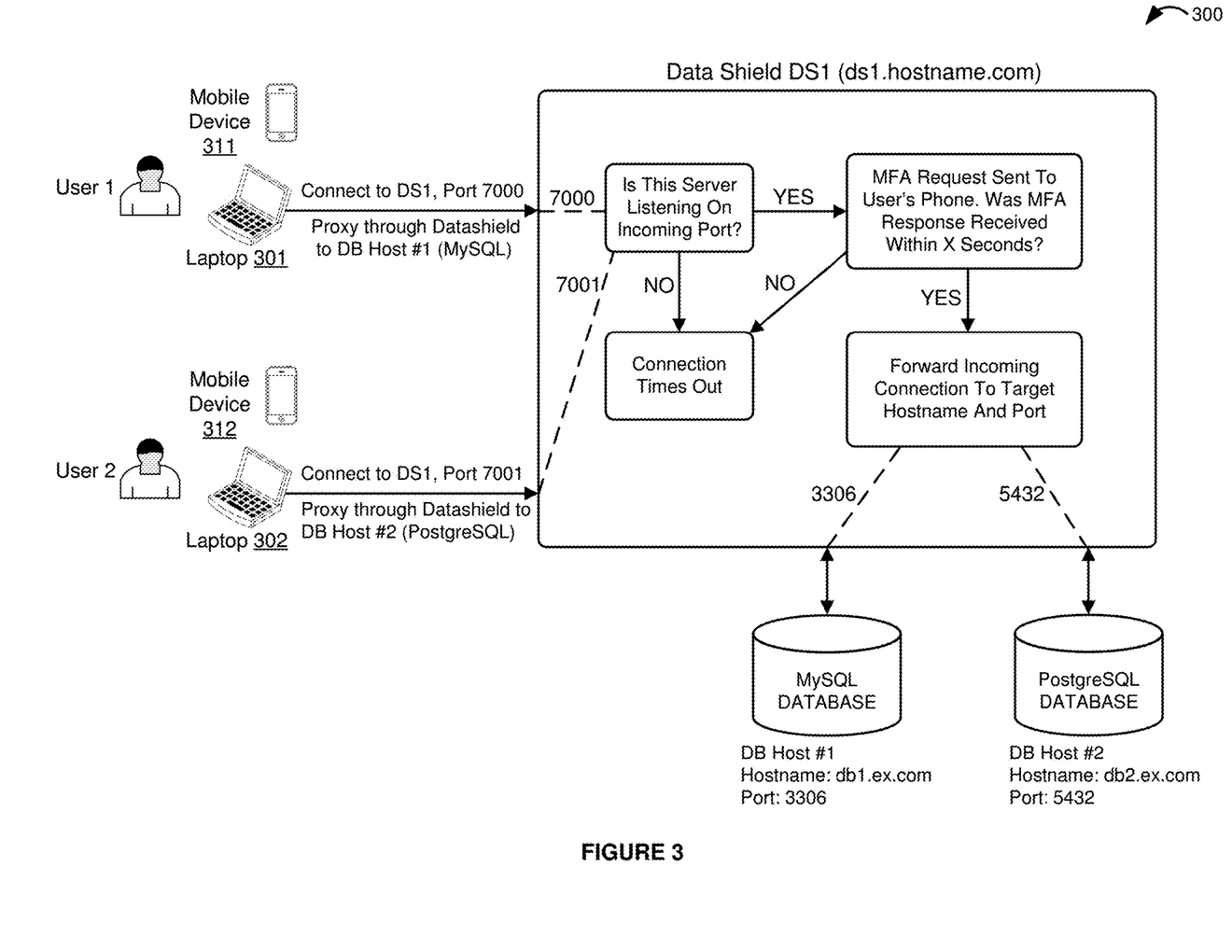
FIG. 3 is a flow diagram that illustrates an operation of a communication system in an exemplary embodiment.
Figure 4:
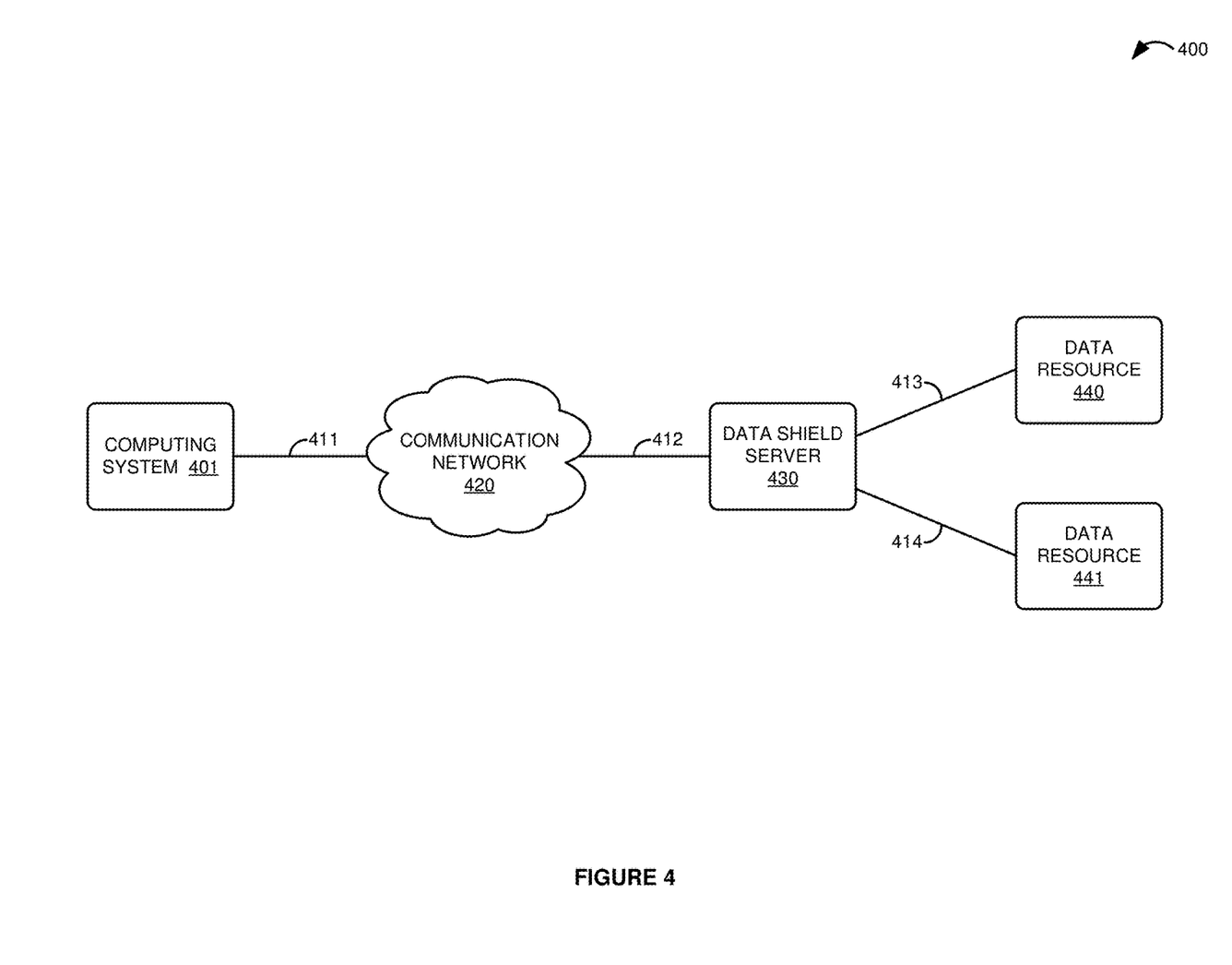
FIG. 4 is a block diagram that illustrates a communication system in an exemplary embodiment.
Figure 5:
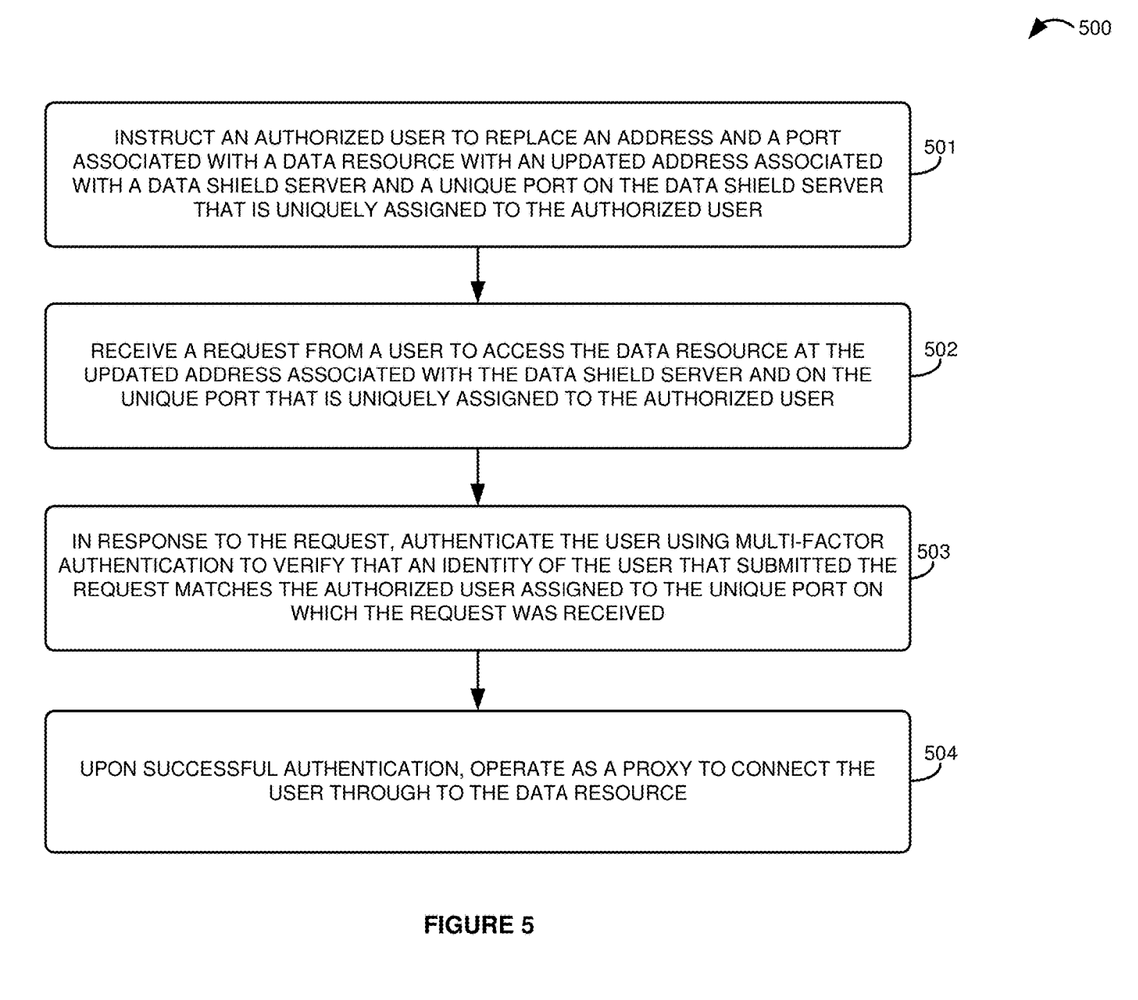
FIG. 5 is a flow diagram that illustrates an operation of a communication system in an exemplary embodiment.
Figure 6:
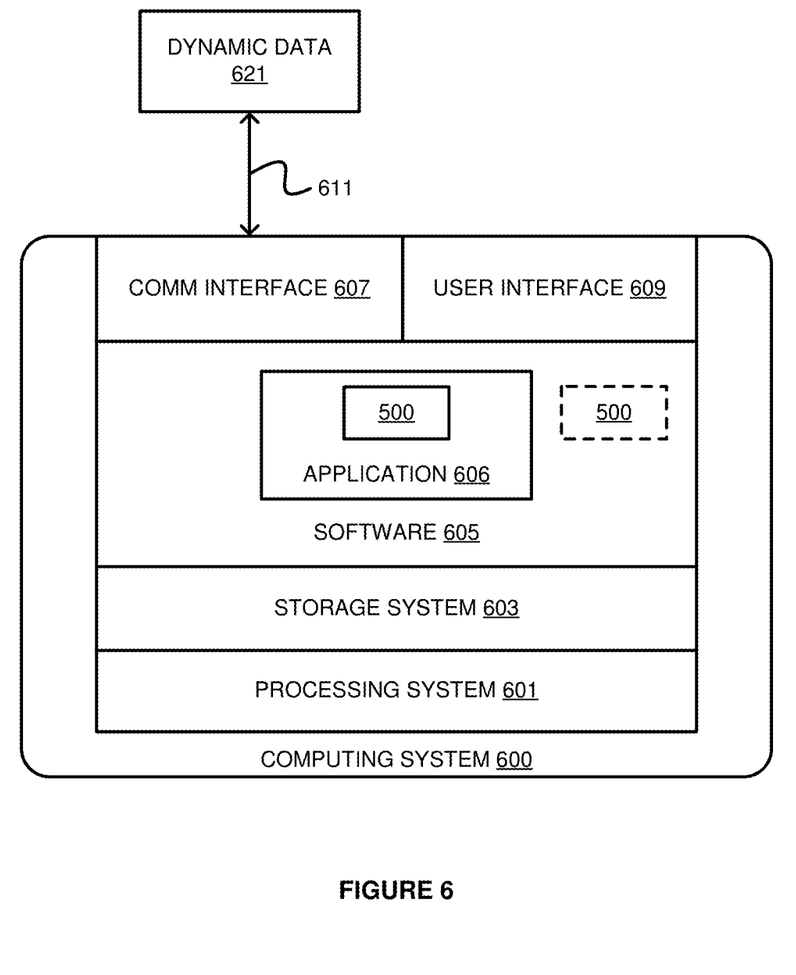
FIG. 6 is a block diagram that illustrates a computing system in an exemplary embodiment.

Referring now to the drawings, FIG. 1 illustrates a communication system with host systems that are exposed and allowing direct connections from users without the protection of a data shield server, and the various problems that arise from this configuration. In contrast, FIG. 2 illustrates the employment of a data shield server positioned between the users and the host systems, thereby safeguarding the hosts from direct exposure to the users and potentially unauthorized access. FIG. 3 is a flow diagram that illustrates an exemplary operation that utilizes a data shield server as a proxy to connect users through to database systems. FIG. 4 illustrates a communication system comprising a data shield server in an exemplary embodiment. FIG. 5 is a flow diagram that illustrates an exemplary operation of the data shield server to protect data resources, while FIG. 6 illustrates an exemplary computing system that may be used to perform any of the data shield processes and operational scenarios described herein.

Turning now to FIG. 1, a block diagram of communication system 100 is illustrated. Communication system 100 includes employee A computing system 101, employee B computing system 102, database host 110 (DB-HOST-1), database host 120 (DB-HOST-2), Oracle® database DB-1, and MySQL database DB-2. Communication system 100 provides an example of host systems 110 and 120 that are exposed and allowing direct connections from user computing systems 101 and 102. As shown in FIG. 1, employee A is operating computing system 101 to execute Oracle Developer integrated development environment (IDE) software to access DB-HOST-1 by specifying the target host of DB-Host-1.mstream.com and port 1501. Employee A also specifies the login credentials needed to access the Oracle database DB-1 through DB-HOST-1.

Similarly, employee B is operating computing system 102 to execute MySQL workbench software to access DB-HOST-2 by specifying the target host of DB-Host-2.mstream.com and the default MySQL port 3306. Employee B also specifies the login credentials needed to access the MySQL database DB-2 through DB-HOST-2. Unfortunately, this configuration introduces substantial security problems because the database host information is exposed to all users and anyone connecting over the Internet. In addition, the historical security information for each of the databases is difficult to audit because logs would need to be extracted from each database in order to view this information. Finally, because there is no system in place that requires users to authenticate using MFA, the hosts 110 and 120 and databases are vulnerable to credential replay attacks. A system that avoids these security threats and other problems by employing a data shield server will now be discussed with respect to FIG. 2.

FIG. 2 is a block diagram that illustrates communication system 200 in an exemplary implementation. Communication system 200 is similar to communication system 100 shown in FIG. 1, except that communication system 200 includes the addition of a data shield server positioned between employee computing systems 101 and 102 and the database hosts 110 and 120. The data shield server functions to safeguard the database hosts 110 and 120 from security threats that would otherwise be introduced by exposing the database host connection information to the users as discussed above with respect to communication system 100 in FIG. 1.

In operation, the data shield server assigns unique port numbers to each of the employee users A and B for the specific host systems they are authorized to access. The mapping of each unique port to its associated user is maintained within the data shield server and allows for translation of any port used to connect to the server to the unique identity of its associated user. In this example, employee A is assigned port 5000 to access Oracle database DB-1 over data shield server address orc.dbshield.mstream.com, and employee B is assigned port 5001 to access MySQL database DB-2 over data shield server address mysql.dbshield.mstream.com. In order to instruct employees A and B to connect through the data shield server to gain access to the respective databases they are authorized to access, the data shield server provides the unique port number and data shield server address assigned to each of the employees A and B, respectively. Accordingly, in this example the data shield server instructs employee A to update the connection information for accessing the DB-1 Oracle database with the orc.dbshield.mstream.com host address and the unique port 5000 assigned to employee A for this connection. Likewise, the data shield server instructs employee B to update the connection information for accessing the DB-2 MySQL database with the mysql.dbshield.mstream.com host address and the unique port 5001 assigned to employee B for this connection.

Once the connection information has been updated, employee A operates computing system 101 to execute Oracle Developer IDE software to access DB-HOST-1 by connecting to the target host of orc.dbshield.mstream.com on port 5000, instead of the actual host address of DB-Host-1.mstream.com and port 1501. Employee A also specifies the login credentials needed to access the Oracle database DB-1 through DB-HOST-1. When the data shield server receives the connection request from employee A at orc.dbshield.mstream.com on port 5000, the data shield server identifies that the connection request must be coming from employee A because it is received over port 5000 which is uniquely mapped to employee A. Accordingly, the data shield server requires employee A to complete MFA to verify that the identity of the user attempting to connect to DB-1 at orc.dbshield.mstream.com on port 5000 is indeed employee A. Once employee A passes MFA, such as by facial recognition, fingerprint, or a one-time pass code received over a secondary device, the data shield server permits employee A to access Oracle Database DB-1 by acting as a proxy to connect employee A on to DB-HOST-1 indirectly through the data shield server. Beneficially, the actual target host address of DB-Host-1.mstream.com and port 1501 remain hidden to employee A, and are only known by the data shield server to establish the connection by proxy.

Likewise, employee B operates computing system 102 to execute MySQL workbench software to access DB-HOST-2 by connecting to the target host of mysql.dbshield.mstream.com on port 5001, instead of the actual host address of DB-Host-2.mstream.com on default port 3306. Employee B also specifies the login credentials needed to access the MySQL database DB-2 through DB-HOST-2. When the data shield server receives the connection request from employee B at mysql.dbshield.mstream.com on port 5001, the data shield server identifies that the connection request must be coming from employee B because it is received over port 5001, which is uniquely mapped to employee B for the mysql.dbshield.mstream.com host address. Accordingly, the data shield server requires employee B to complete MFA to verify that the identity of the user attempting to connect to DB-2 at mysql.dbshield.mstream.com on port 5001 is actually employee B. Once employee B passes MFA, the data shield server permits employee B to access MySQL Database DB-2 by acting as a proxy to connect employee B on to DB-HOST-2 indirectly through the data shield server. Again, the actual target host address of DB-Host-2.mstream.com and port 3306 remain hidden to employee B, and are only known by the data shield server to establish the connection by proxy.

Advantageously, the security solution described in FIG. 2 enables the actual database host address information to remain hidden, and no direct access to the database hosts 110 and 120 is allowed. Instead, the data shield server provides a novel security layer between the users and the hosts, thereby safeguarding the hosts from unauthorized access and malicious actors. In addition, auditing the historical security information for each of the databases is facilitated because all logs are centralized within the data shield server. Further, by requiring each user to complete MFA to verify that the user's identity matches the identity of the user uniquely assigned to the port on which a connection request is received, the data shield server is able to ensure that only authorized users are allowed to access the protected data resources. The use of MFA also helps to prevent account takeover, which can happen when a different person than the authorized user manages to gain access to the resources through that authorized user's workstation. Another exemplary workflow of a data shield working to protect data resources will now be discussed with respect to FIG. 3.

FIG. 3 is a flow diagram that illustrates an operation of communication system 300 in an exemplary embodiment. Communication system 300 includes user 1 operating laptop 301 and mobile device 311, and user 2 operating laptop 302 and mobile device 312. The functional decision flow that occurs within the data shield server is shown within data shield DS1 in FIG. 3. The data shield server functions to safeguard the database hosts from security threats that would otherwise be introduced by exposing the connection information for the database hosts to the users.

In operation, the data shield server assigns unique port numbers to each of the users 1 and 2 for the specific host systems they are authorized to access. In this example, user 1 is assigned port 7000 to access the MySQL database on DB Host #1, and user 2 is assigned port 7001 to access the PostgreSQL database on DB Host #2. Once the users have been informed of their uniquely assigned port numbers and the hostname of the data shield server at ds1.hostname.com, user 1 operates laptop 301 to connect to data shield DS1 on port 7000 in order to proxy through the data shield to DB Host #1 for access to the MySQL database. Likewise, user 2 operates laptop 302 to connect to data shield DS1 on port 7001 in order to proxy through the data shield to DB Host #2 for access to the PostgreSQL database. If the data shield server is not listening on the incoming ports, the connection times out, which would happen if the ports used to connect to the data shield were not assigned to any user. However, in this case, both ports 7000 and 7001 are assigned to users 1 and 2, respectively, so the data shield sends MFA requests to the mobile devices 311 and 312 of the users associated with respective ports 7000 and 7001. Specifically, when the data shield server receives the connection request from user 1 on port 7000, the data shield server identifies that the connection request must be coming from user 1 because it is received over port 7000 which is uniquely assigned to user 1 for the DB Host #1 host address, so the data shield server requires user 1 to complete MFA to verify that the identity of the user attempting to connect to the DB Host #1 on port 7000 is indeed user 1. Likewise, since the data shield server receives the connection request from user 2 on port 7001, the data shield server requires user 2 to complete MFA to verify the identity of user 2 because port 7001 is uniquely tied to user 2 for the DB Host #2 host address.

In this example, the users each provide a unique username and password or some other login credentials used to access the database hosts that they are attempting to connect to, along with providing a secondary authentication in response to the MFA request, such as a one-time password delivered to the mobile devices 311 and 312 of respective users 1 and 2 for identity verification. When the data shield receives a valid response to the MFA request within a specific time period, the data shield then forwards the incoming connection for each user to the target hostname and port. For example, after user 1 passes MFA and is authenticated, the data shield acts as a proxy to forward the connection of user 1 on port 7000 to DB Host #1 on host db1.ex.com and port 3306, along with the credentials provided by user 1 required to access the mySQL database. Likewise, after user 2 authenticates with MFA, the data shield forwards the connection of user 2 on port 7001 to connect via proxy to DB Host #2 at db2.ex.com on port 5432, including the login credentials provided by user 2 needed to access the PostgreSQL database on DB Host #2. Beneficially, the actual target host addresses of DB Host #1 and DB Host #2 remain concealed and unknown to the users, and are only known by the data shield server to establish the connections by proxy.

Although this example describes a situation where the users still provide their original login credentials used to access the database hosts, in some implementations there may be cases where successful MFA could be the only requirement to forward the connection to a data resource, which could effectively provide authentication security on a data resource that does not otherwise perform authentication. For example, in the flow diagram of FIG. 3, the login and password credentials that the users provide to connect to the databases may be ignored or not required, because the unique port mapping and mobile device MFA requests could provide sufficient authentication of the users. This is because only user 1 is authorized to connect to the MySQL database through data shield DS1 on port 7000 and will have access to mobile device 311, so by authenticating user 1 by sending an MFA request to mobile device 311 of user 1, the data shield can ensure that the identity of the user who is attempting to connect to the MySQL database is indeed user 1 who is authorized for this connection. Similarly, connection requests for DB Host #2 received by the data shield on port 7001 could be authenticated by sending an MFA request to mobile device 312 of user 2, because only user 2 should have access to mobile device 312. In some implementations, stricter authentication than one-time pass codes sent to the users' mobile devices may be required, such as facial recognition or fingerprint identification, and some hosts could require multiple authentication techniques. Another exemplary communication system that may be employed to facilitate protection of data resources from unauthorized access will now be discussed with respect to FIG. 4.

FIG. 4 is a block diagram that illustrates communication system 400 in an exemplary embodiment. Communication system 400 includes user computing system 401, communication network 420, data shield server 430, and data resources 440 and 441. In operation, a user operates computing system 401 to access data resources 440 and 441 over communication network 420 via data shield server 430 acting as a proxy. An exemplary operation of data shield server 430 to protect data resources 440 and 441 from unauthorized access will now be discussed with respect to FIG. 5.

FIG. 5 is a flow diagram that illustrates an operation 500 in an exemplary implementation. The operation 500 shown in FIG. 5 may also be referred to as data shield process 500 herein. The steps of the operation are indicated below parenthetically. The following discussion of operation 500 may proceed with reference to elements of FIG. 4 in order to illustrate its operations, but note that the details provided in FIG. 4 are merely exemplary and not intended to limit the scope of process 500 to the specific implementation shown in FIG. 4. Operation 500 may also be combined with the techniques described above with respect to FIGS. 2 and 3 in some implementations.

Operation 500 may be employed to facilitate protection of data resources 440 and 441 from unauthorized access. As shown in the operational flow of FIG. 5, an authorized user is instructed to replace an address and a port associated with data resource 440 with an updated address associated with data shield server 430 and a unique port on data shield server 430 that is uniquely assigned to the authorized user (501). In some examples, data resource 440 could comprise any host, server, database, web application, cloud service, or other data resource platform that authenticates over a transmission control protocol (TCP)/IP connection. In order to connect to data resource 440, the actual address and port of the resource 440 is replaced with the address of data shield server 430 and the unique port on data shield server 430 that is uniquely assigned to the authorized user for data resource 440. In some examples, the addresses of data resource 440 and data shield server 430 could comprise IP addresses, fully qualified domain names, or any other host address information. In at least one implementation, an administrator of data resource 440 may register data resource 440 with data shield server 430 and specify the address and port that data shield server 430 can use to connect to data resource 440. In some examples, the administrator may also use an interface of data shield server 430 to specify which users, employees, contractors, or service accounts of a company need access to data resource 440. In some implementations, data shield server 430 may then send an email or some other means of contact to the identified users in order to instruct them to update the host address and port of data resource 440 with the updated address and unique port provided by data shield server 430. In this case, an authorized user follows the instructions in the email or other message and operates computing system 401 to replace the actual host address and port of data resource 440 with the address of data shield server 430 and the unique port assigned to the user for this resource 440. Note that the unique ports are uniquely associated with the identities of the individual users and data resources 440 and 441 to which they have access. For example, a user that is authorized to access more than one data resource 440 and 441 would be assigned a different unique port for each data resource 440 and 441 that the user is authorized to access.

A request is received from a user to access data resource 440 at the updated address associated with data shield server 430 and on the unique port that is uniquely assigned to the authorized user (502). In at least one implementation, data shield server 430 may keep track of which ports are uniquely assigned to which users and for which data resources 440 and 441 in a port mapping table or some other data structure. Accordingly, when data shield server 430 receives the request to access data resource 440 on the unique port assigned to the authorized user, data shield server 430 is able to identify the authorized user based on the unique port that was assigned to that user for data resource 440. In some implementations, the request could include login credentials for the user to access data resource 440. For example, the login credentials included in the request could comprise a username and password for data resource 440. In at least one implementation, the authorized user could continue to use the same login credentials that the authorized user previously used to access data resource 440 directly, but in some implementations, the authorized user could be issued new credentials that are recognized by data shield server 430 for the user to access data resource 440. Further, in some implementations the login credentials included in the request are not valid for the user to access data resource 440 directly but are valid and recognized by data shield server 430, and valid login credentials for the user to access the data resource are hidden from the user but are known to data shield server 430.

In response to the request, the user is authenticated using multi-factor authentication to verify that an identity of the user that submitted the request matches the authorized user assigned to the unique port on which the request was received (503). For example, after data shield server 430 identifies the authorized user based on the unique port number of the request, data shield server 430 may utilize facial recognition, fingerprint identification, one-time pass code verification sent to a verified email address or mobile device known to belong to the authorized user, security questions, or any other type of MFA technique, including combinations thereof. In some implementations, the administrator of data resource 440 could configure which authentication techniques are approved for various users or user roles to access data resource 440. Beneficially, since users are required to go through the MFA process for authentication before they are permitted to access data resource 440, attempts to use shared or stolen credentials or accounts to gain unauthorized access to the resource are thwarted, as the users may be forced to use fingerprint verification, facial identification, and other secure authentication methods to validate their identity.

Upon successful authentication, data shield server 430 operates as a proxy to connect the user through to data resource 440 (504). When the user is authenticated and allowed to access data resource 440, the user is still not permitted to access data resource 440 directly, but is instead routed through data shield server 430 which acts as a proxy to connect the user through to data resource 440. In this manner, the actual host address and port information of data resource 440 is not exposed to the user and remains secretive, which helps protect data resource 440 from unauthorized access attempts. In some implementations, data shield server 430 may operate as a proxy to connect the user through to data resource 440 by submitting the login credentials for the user to data resource 440 and connecting the user through to data resource 440 upon successful validation of the login credentials by data resource 440. Further, in at least one implementation, the login credentials included in the request are not valid for the user to access data resource 440 directly but are recognized as valid by data shield server 430, and the valid login credentials for the user to access the data resource are hidden from the user but are known to data shield server 430. In this case, data shield server 430 may operate as a proxy to connect the user through to data resource 440 by validating the login credentials submitted by the user in the request and responsively submitting the valid login credentials that are hidden from the user to data resource 440 that are valid for the user to access data resource 440, and then connecting the user through to data resource 440 upon successful validation of the valid login credentials by data resource 440.

In some implementations, data shield server 430 may constantly check for any changes made to data resource 440 in the backend, and then reconfigure itself to ensure that even if the configuration on data resource 440 changes, data shield server 430 can still provide access to users without involving manual actions from users. Further, when administering data shield server 430 for a particular data resource 440, data shield server 430 could be bound to generate port numbers in specified ranges for specific user and resource combinations. For example, data shield server 430 may be configured to generate port numbers in ranges from 3,000 to 30,000. Further, the port numbers may be assigned randomly, or could be serially generated in some examples, such as for user X-resource Y (port 3000) and user X-resource Z (3001), or user X-resource Y (port 3000) and user X-resource Z (4000).

In at least one implementation, data shield server 430 may also inspect the data traffic sent by computing system 401 to data resource 440 and not allow certain commands to be run on data resource 440. For example, if a user connects to data resource 440 through data shield server 430, the user might have limited permissions to make changes to data resource 440, or restrictions on what queries the user is allowed to run or what output the user is allowed to receive back from a query. These and other restrictions may be enforced directly by data shield server 430 monitoring the commands the user is sending to data resource 440 and filtering out any restricted data items that are returned from data resource 440 in response to the user's queries. For example, in at least one implementation, data shield server 430 could monitor data received from data resource 440 and filter out restricted data items that are returned by data resource 440 that the user is not authorized to receive. In some implementations, data shield server 430 could also monitor commands submitted by the user to data resource 440, intercept an unauthorized command for an action that the user is not authorized to perform, and block the unauthorized command from reaching data resource 440. For example, data shield server 430 could intercept commands sent by the user to data resource 440 and analyze them before allowing them to reach data resource 440, and if data shield server 430 determines that the command violates a rule for that user, the command could be blocked from reaching data resource 440. In addition, data shield server 430 may also have the ability to sanitize the output of any command run on data resource 440, which could also be based on user permissions or access level. For example, data shield server 430 could prevent returning back any sensitive or confidential data that the user is not authorized to access, such as social security numbers, credit card numbers, credentials, or any other protected information. In some implementations, data shield server 430 could monitor commands submitted by the user to data resource 440, intercept an unauthorized command for an action that the user is not authorized to perform, and modify the unauthorized command to remove the action that the user is not authorized to perform. For example, when data shield server 430 intercepts an unauthorized query from the user, data shield server 430 could modify the query and send a refined command that instructs data resource 440 to return the requested usernames, emails, and phone numbers, but not passwords which the user is not permitted to view. Further, in implementations where data resource 440 comprises a database system, this type of control may be database-platform specific, so another field may be added in order to specify the type of database platform to which the user is connecting so that data shield server 430 could format the modified query for data resource 440 appropriately.

In some implementations, data shield server 430 could be configured to replace the username and password supplied by the end user by injecting a different username and password into the connection for data resource 440, which may be done to hide the real credentials from the end user. For example, data shield server 430 could perform this credential substitution to provide increased security for data resource 440 by utilizing secure credentials for data resource 440 that are unknown to the user. In this case, data shield server 430 would need to keep track of both the original username and password that the user will provide and the updated username and password for the user that are valid for data resource 440 in order to replace the old or inactive credentials provided by the user and submit the actual valid credentials instead. In this manner, data resource 440 would receive a valid username and password as swapped in by data shield server 430, but these valid credentials are not exposed to the end user, who only has old, inactive, or invalid credentials for accessing data resource 440 directly, but that are still valid and recognized by data shield server 430. Further, in some implementations, the credentials provided by the user could be ignored by data shield server 430, which instead could rely on the unique port mapping and MFA to authenticate the user, and then provide the valid username and password for the user when connecting the user over to data resource 440.

In order to prevent users from accessing data resource 440 directly, such as by using their old credentials and connecting to the actual host address and port of data resource 440, the administrator of data resource 440 would need to remove the ability for any IP address to connect to resource 440 directly except for the IP address of data shield server 430 and any other authorized systems. For example, in at least one implementation, the updated address associated with data shield server 430 may be whitelisted on data resource 440 so that data shield server 430 is allowed to connect to data resource 440 directly. In this manner, the IP address of data shield server 430 would still be allowed to connect to data resource 440 directly, which can then connect the users through to data resource 440 acting as a proxy. By limiting access for direct connections to data resource 440 to only data shield server 430 and other authorized systems, all of the administration discussed herein is enabled. For example, if some employees leave the company, the company can administer the necessary changes through data shield server 430 to remove those users from data shield server 430 and revoke their access, whereas before the administrator would have to manually reconfigure data resource 440 and run commands to individually revoke access on all of the respective databases and other computing resources that the users had access to, so revoking their access through data shield server 430 greatly facilitates this process.

Additionally, in some implementations there may be administrative options for data shield server 430 to only allow certain authorized IP addresses to connect to data shield server 430. For example, data shield server 430 could be configured to only permit a particular static IP address to connect to data shield server 430, which could be an internal corporate IP address that is known to be trusted and secure. In other examples, data shield server 430 may be limited to only allow a specified group or range of IP addresses, such as IP addresses belonging to a corporate network. In this case, the users could only connect to data shield server 430 from their corporate network connection, which could require utilizing a virtual private network (VPN) connection to connect to their work server from other unsecure locations, and then using that VPN connection to connect through to data shield server 430 and access data resource 440 through the data shield server 430 proxy connection.

Advantageously, data shield server 430 provides a robust security layer between the users and the host systems, thereby safeguarding the hosts from unauthorized access and malicious actors. By instructing users to switch the actual host address and port information of data resource 440 for the address and unique port of data shield server 430, the actual host address and port remain hidden, and direct access to data resource 440 is not allowed. Further, by requiring each user to complete MFA and ensuring that the user's identity is verified and matches the identity of the authorized user that is uniquely assigned to the port on which a connection request is received, data shield server 430 is able to ensure that only authorized users are allowed to access protected data resources 440 and 441.

Now referring back to FIG. 4, computing system 401 and communication network 420 communicate over communication link 411, while data shield server 430 and communication network 420 communicate over communication link 412. Data shield server 430 and data resource 440 are in communication over communication link 413, while data shield server 430 and data resource 441 communicate over communication link 414. Note that although data shield server 430 is shown in communication with data resources 440 and 441 over respective communication links 413 and 414 for simplicity of illustration, data shield server 430 could communicate with data resources 440 and 441 over other intermediate networks, systems, or devices in some implementations, including communication network 420 in some examples.

Computing system 401 comprises a processing system and communication transceiver. Computing system 401 may also include other components such as a user interface, data storage system, and power supply. Computing system 401 may reside in a single device or may be distributed across multiple devices. Examples of computing system 401 include mobile computing devices, such as cellular phones, tablet computers, laptop computers, notebook computers, and gaming devices, as well as any other type of mobile computing devices and any combination or variation thereof. Examples of computing system 401 also include desktop computers, server computers, cloud computing platforms, and virtual machines, as well as any other type of computing system, variation, or combination thereof.

Communication network 420 could comprise multiple network elements such as modems, routers, gateways, telecommunication switches, servers, processing systems, or other communication equipment and systems for providing communication and data services. In some examples, communication network 420 could comprise wireless communication nodes, wireless access points, network switches, Internet routers, firewalls, network gateways, application servers, databases, virtual private network (VPN) servers, virtual machines, virtualized services, cloud-based services, computer systems, communication links, or some other type of communication equipment, including combinations thereof. Communication network 420 may also comprise wireless networks, optical networks, packet networks, local area networks (LAN), metropolitan area networks (MAN), wide area networks (WAN), or other network topologies, equipment, or systems, including combinations thereof. Communication network 420 may be configured to communicate over metallic, wireless, or optical links. Communication network 420 may be configured to use IP, Ethernet, wireless protocols, optical networking, hybrid fiber coax (HFC), communication signaling, or some other communication format, including combinations thereof. In some examples, communication network 420 includes further access nodes and associated equipment for providing communication services to several computer systems across a large geographic region.

Data shield server 430 may be representative of any computing apparatus, system, or systems that may connect to another computing system over a communication network. Data shield server 430 comprises a processing system and communication transceiver. In some examples, data shield server 430 may also include other components such as a router, server, data storage system, and power supply. Data shield server 430 may reside in a single device or may be distributed across multiple devices. Data shield server 430 may be a discrete system or may be integrated within other systems, including other systems within communication system 400. Some examples of data shield server 430 include database systems, desktop computers, server computers, cloud computing platforms, and virtual machines, as well as any other type of computing system, variation, or combination thereof. In some examples, data shield server 430 could comprise a network security appliance, firewall, reverse proxy, load balancer, intrusion prevention system, web application firewall, web server, network switch, router, switching system, packet gateway, network gateway system, Internet access node, application server, database system, service node, or some other communication system, including combinations thereof.

Data resources 440 and 441 each individually comprise any computing resource that may be accessed by a computing system over a communication network, such as a web application or service. Data resources 440 and 441 are executed on one or more computing systems comprising at least a processing system and communication transceiver, and may also include other components such as a router, server, data storage system, and power supply. In at least one implementation, data resources 440 and 441 could be hosted by any cloud computing platform that provides computing services over a communication network. In some examples, data resources 440 and 441 could comprise database systems, web applications, cloud services, or some other computing resource, application, or service. The computing system that hosts data resources 440 and 441 may be contained in a single device or may be distributed across multiple devices, and may be a discrete system or may be integrated within other systems, including other systems within communication system 400. Some examples of computing systems that may host or otherwise provide data resources 440 and 441 include desktop computers, server computers, cloud computing platforms, and virtual machines, as well as any other type of computing system, variation, or combination thereof.

Communication links 411-414 use metal, air, space, optical fiber such as glass or plastic, or some other material as the transport medium, including combinations thereof. Communication links 411-414 could use various communication protocols, such as IP, Ethernet, wireless protocols, optical networking, HFC, communication signaling, or some other communication format, including combinations thereof. Communication links 411-414 could be direct links or may include intermediate networks, systems, or devices.

Turning now to FIG. 6, a block diagram is shown that illustrates computing system 600 in an exemplary implementation. Computing system 600 provides an example of computing system 401, data shield server 430, or any computing system that may be used to execute data shield process 500 or variations thereof, although such systems could use alternative configurations. Computing system 600 includes processing system 601, storage system 603, software 605, communication interface 607, and user interface 609. Software 605 includes application 606 which itself includes data shield process 500. Data shield process 500 may optionally be implemented separately from application 606, as indicated by the dashed line in FIG. 6.

Computing system 600 may be representative of any computing apparatus, system, or systems on which application 606 and data shield process 500 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system, variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for data shield process 500 or variations thereof. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer-readable storage media capable of storing software 605 and readable by processing system 601. Storage system 603 may include volatile and nonvolatile, removable and non-removable media implemented in any method or technology for storage of information, such as computer-readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of computer-readable storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 609, processing system 601 may load and execute portions of software 605, such as data shield process 500, to facilitate protection of data resources from unauthorized access. Software 605 may be implemented in program instructions and among other functions may, when executed by computing system 600 in general or processing system 601 in particular, direct computing system 600 or processing system 601 to instruct an authorized user to replace an address and a port associated with a data resource with an updated address associated with a data shield server and a unique port on the data shield server that is uniquely assigned to the authorized user. In addition, software 605 directs computing system 600 or processing system 601 to receive a request from a user to access the data resource at the updated address associated with the data shield server and on the unique port that is uniquely assigned to the authorized user. Software 605 may further direct computing system 600 or processing system 601 to, in response to the request, authenticate the user using multi-factor authentication to verify that an identity of the user that submitted the request matches the authorized user assigned to the unique port on which the request was received. Finally, software 605 may direct computing system 600 or processing system 601 to, upon successful authentication, operate as a proxy to connect the user through to the data resource.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601.

In general, software 605 may, when loaded into processing system 601 and executed, transform computing system 600 overall from a general-purpose computing system into a special-purpose computing system customized to facilitate protection of data resources from unauthorized access as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer-storage media are characterized as primary or secondary storage.

In some examples, if the computer-readable storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 600 is generally intended to represent a computing system with which software 605 is deployed and executed in order to implement application 606 and/or data shield process 500 (and variations thereof). However, computing system 600 may also represent any computing system on which software 605 may be staged and from where software 605 may be distributed, transported, downloaded, or otherwise provided to yet another computing system for deployment and execution, or yet additional distribution. For example, computing system 600 could be configured to deploy software 605 over the internet to one or more client computing systems for execution thereon, such as in a cloud-based deployment scenario.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 609. In some examples, user interface 609 could include a touch screen capable of displaying a graphical user interface that also accepts user inputs via touches on its surface. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface. User interface 609 may be omitted in some examples.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computing system to facilitate protection of data resources from unauthorized access, the method comprising:
   assigning, to an authorized user that is authorized to access a data resource, a unique port number on a data shield server that is associated with the data resource;
   instructing the authorized user to replace an address and a port associated with the data resource with an updated address associated with the data shield server and the unique port on the data shield server that is uniquely assigned to the authorized user, wherein the authorized user is assigned a different unique port for each data resource said user is authorized to access;
   receiving a request from a user to access the data resource at the updated address associated with the data shield server and on the unique port that is uniquely assigned to the authorized user;
   in response to the request, authenticating the user using multi-factor authentication to verify that an identity of the user that submitted the request matches the authorized user assigned to the unique port on which the request was received; and
   upon successful authentication, operating as a proxy to connect the user through to the data resource.

2. The method of claim 1 wherein the request includes login credentials for the user to access the data resource.

3. The method of claim 2 wherein operating as the proxy to connect the user through to the data resource comprises submitting the login credentials for the user to the data resource and connecting the user through to the data resource upon successful validation of the login credentials by the data resource.

4. The method of claim 2 wherein the login credentials included in the request are not valid to access the data resource but are valid to access the data shield server and valid login credentials for the user to access the data resource are hidden from the user, and wherein operating as the proxy to connect the user through to the data resource comprises validating the login credentials submitted by the user in the request to access the data shield server and responsively submitting the valid login credentials for the user to the data resource that are valid for the user to access the data resource.

5. The method of claim 1 further comprising monitoring data received from the data resource, filtering out restricted data items that are returned by the data resource that the user is not authorized to receive, and transferring a remaining portion of the data received from the data resource to the user.

6. The method of claim 1 further comprising monitoring commands submitted by the user to the data resource, intercepting an unauthorized command for an action that the user is not authorized to perform, blocking the unauthorized command from reaching the data resource, and transferring a remaining portion of the commands submitted by the user to the data resource.

7. The method of claim 1 wherein the updated address associated with the data shield server is whitelisted on the data resource so that the data shield server is allowed to connect to the data resource directly.

8. One or more non-transitory computer-readable storage media having program instructions stored thereon to facilitate protection of data resources from unauthorized access, wherein the program instructions, when executed by a computing system, direct the computing system to at least:
assign, to an authorized user that is authorized to access a data resource, a unique port number on a data shield server that is associated with the data resource;
instruct the authorized user to replace an address and a port associated with the data resource with an updated address associated with the data shield server and the unique port on the data shield server that is uniquely assigned to the authorized user, wherein the authorized user is assigned a different unique port for each data resource said user is authorized to access;
receive a request from a user to access the data resource at the updated address associated with the data shield server and on the unique port that is uniquely assigned to the authorized user;
in response to the request, authenticate the user using multi-factor authentication to verify that an identity of the user that submitted the request matches the authorized user assigned to the unique port on which the request was received; and
upon successful authentication, operate as a proxy to connect the user through to the data resource.

9. The non-transitory computer-readable storage media of claim 8 wherein the request includes login credentials for the user to access the data resource.

10. The non-transitory computer-readable storage media of claim 9 wherein the program instruction direct the computing system to operate as the proxy to connect the user through to the data resource by directing the computing system to submit the login credentials for the user to the data resource and connect the user through to the data resource upon successful validation of the login credentials by the data resource.

11. The non-transitory computer-readable storage media of claim 9 wherein the login credentials included in the request are not valid to access the data resource but are valid to access the data shield server and valid login credentials for the user to access the data resource are hidden from the user, and wherein the program instruction direct the computing system to operate as the proxy to connect the user through to the data resource by directing the computing system to validate the login credentials submitted by the user in the request to access the data shield server and responsively submit the valid login credentials for the user to the data resource that are valid for the user to access the data resource.

12. The non-transitory computer-readable storage media of claim 8 wherein the program instructions further direct the computing system to monitor data received from the data resource, filter out restricted data items that are returned by the data resource that the user is not authorized to receive, and transfer a remaining portion of the data received from the data resource to the user.

13. The non-transitory computer-readable storage media of claim 8 wherein the program instructions further direct the computing system to monitor commands submitted by the user to the data resource, intercept an unauthorized command for an action that the user is not authorized to perform, block the unauthorized command from reaching the data resource, and transfer a remaining portion of the commands submitted by the user to the data resource.

14. The non-transitory computer-readable storage media of claim 8 wherein the updated address associated with the data shield server is whitelisted on the data resource so that the data shield server is allowed to connect to the data resource directly.

15. An apparatus to facilitate protection of data resources from unauthorized access, the apparatus comprising:
one or more computer-readable storage media;
a processing system operatively coupled with the one or more computer-readable storage media; and
program instructions stored on the one or more computer-readable storage media that, when executed by the processing system, direct the processing system to at least:
assign, to an authorized user that is authorized to access a data resource, a unique port number on a data shield server that is associated with the data resource;
instruct the authorized user to replace an address and a port associated with the data resource with an updated address associated with the data shield server and the unique port on the data shield server that is uniquely assigned to the authorized user, wherein the authorized user is assigned a different unique port for each data resource said user is authorized to access;
receive a request from a user to access the data resource at the updated address associated with the data shield server and on the unique port that is uniquely assigned to the authorized user;
in response to the request, authenticate the user using multi-factor authentication to verify that an identity of the user that submitted the request matches the authorized user assigned to the unique port on which the request was received; and
upon successful authentication, operate as a proxy to connect the user through to the data resource.

16. The apparatus of claim 15 wherein the request includes login credentials for the user to access the data resource.

17. The apparatus of claim 16 wherein the program instruction direct the computing system to operate as the proxy to connect the user through to the data resource by directing the computing system to submit the login credentials for the user to the data resource and connect the user through to the data resource upon successful validation of the login credentials by the data resource.

18. The apparatus of claim 16 wherein the login credentials included in the request are not valid to access the data resource but are valid to access the data shield server and valid login credentials for the user to access the data resource are hidden from the user, and wherein the program instruction direct the computing system to operate as the proxy to connect the user through to the data resource by directing the computing system to validate the login credentials submitted by the user in the request to access the data shield server and responsively submit the valid login credentials for the user to the data resource that are valid for the user to access the data resource.

19. The apparatus of claim 15 wherein the program instructions further direct the computing system to monitor data received from the data resource, filter out restricted data items that are returned by the data resource that the user is not authorized to receive, and transfer a remaining portion of the data received from the data resource to the user.

20. The apparatus of claim 15 wherein the program instructions further direct the computing system to monitor commands submitted by the user to the data resource, intercept an unauthorized command for an action that the user is not authorized to perform, modify the unauthorized command to remove the action that the user is not authorized to perform, and transfer a remaining portion of the commands submitted by the user to the data resource.

* * * * *